(12) United States Patent
Bramhill et al.

(10) Patent No.: US 7,079,649 B1
(45) Date of Patent: Jul. 18, 2006

(54) COPY PROTECTION OF DATA

(75) Inventors: Ian Duncan Bramhill, Ipswich (GB); Matthew Robert Charles Sims, Ipswich (GB)

(73) Assignee: British Telecommunications public limited company, London (GB)

( * ) Notice: Subject to any disclaimer, the term of this patent is extended or adjusted under 35 U.S.C. 154(b) by 709 days.

(21) Appl. No.: 09/091,735

(22) PCT Filed: Mar. 18, 1998

(86) PCT No.: PCT/GB98/00808

§ 371 (c)(1),
(2), (4) Date: Jun. 24, 1998

(87) PCT Pub. No.: WO98/44402

PCT Pub. Date: Oct. 8, 1998

(30) Foreign Application Priority Data

Mar. 27, 1997 (EP) .................................. 97302194

(51) Int. Cl.
*H04K 1/00* (2006.01)
(52) U.S. Cl. .................... 380/21; 382/233; 713/1; 705/400
(58) Field of Classification Search ................ 713/156, 713/158, 164, 200, 201, 160; 705/55–59; 340/825.31; 380/227–228, 239, 278; 707/9–10
See application file for complete search history.

(56) References Cited

U.S. PATENT DOCUMENTS

| | | | | |
|---|---|---|---|---|
| 5,235,642 A | * | 8/1993 | Wobber et al. ............. 713/156 |
| 5,809,145 A | * | 9/1998 | Slik et al. ...................... 705/52 |
| 5,819,293 A | * | 10/1998 | Comer et al. ................ 707/203 |
| 5,841,978 A | * | 11/1998 | Rhoads .......................... 9/217 |
| 5,845,281 A | * | 12/1998 | Benson et al. ................. 707/9 |
| 5,982,899 A | * | 11/1999 | Probst .......................... 713/1 |
| 5,983,348 A | * | 11/1999 | Ji ............................... 713/200 |
| 6,014,651 A | * | 1/2000 | Crawford .................... 705/400 |
| 6,055,314 A | * | 4/2000 | Spies et al. ................... 380/21 |
| 6,092,192 A | * | 7/2000 | Kanevsky et al. .......... 713/186 |
| 6,122,403 A | * | 9/2000 | Rhoads ....................... 382/233 |
| 6,173,332 B1 | * | 1/2001 | Hickman .................... 709/235 |
| 6,182,142 B1 | * | 1/2001 | Win et al. ................... 709/229 |
| 6,212,640 B1 | * | 4/2001 | Abdelnur et al. ........... 713/201 |
| 6,216,173 B1 | * | 4/2001 | Jones et al. ................. 709/202 |
| 6,253,193 B1 | * | 6/2001 | Ginter et al. ................. 705/57 |

FOREIGN PATENT DOCUMENTS

| | | | |
|---|---|---|---|
| EP | A-0718761 | * | 6/1996 |
| WO | WO-A-9407204 | * | 3/1994 |

OTHER PUBLICATIONS

Kobielus, "Buyer's guide, Gotcha!" from Network World Journal, p. 45, Sep. 9, 1996.*
Yordon E., "Java, the Web, and software development", Computer, vol. 29, No. 8, Aug. 1996.*

(Continued)

*Primary Examiner*—Cuong Nguyen
(74) *Attorney, Agent, or Firm*—Nixon & Vanderhye, P.C.

(57) ABSTRACT

A copyright protection scheme downloads data from a server, typically over the World Wide Web to a client for presentation to a user. The downloaded data is cryptographically protected, by encryption and hashing. When displayed by the client, storing and copying functions are selectively disabled in respect of the data, in order to prevent unauthorized copying.

26 Claims, 8 Drawing Sheets

OTHER PUBLICATIONS

Bender W. et al., "Techniques for data hiding", IBM systems journal, vol. 35, No. 3, pp. 313-335, Apr. 1996.*

Dean etal., "Java security: from HotJava to Netscape and beyond", Proc. of the 1996 IEEE symposium on security and privacy, Oakland, CA., pp. 190-200, May 1996.*

M. Satyanarayanan, Coda: A highly available file system for a distributed workstation environment, IEEE, pp. 114-117, Dec. 1989.*

M. Satyanarayanan, et al., A highly available file system for a distributed workstation environment, IEEE, pp. 447-459, Apr. 1990.*

Tobbicke, Distributed file systems: Focus on Andrew File System/Distributed File Service (AFS/DFS), Dec. 1994.*

Gupta et al., Reliable garage collection in distributed object oriented system, Proceedings COMPSAC 88: The 12th Inter. Computer Software and applications conference, Oct. 5-7, 1988, pp. 324-328.*

Journalist's SIG, Feb. 8, 1997, pp. 1-2.

IMPRIMATUR: Special Interest Group Manual, 1997, pp. 1-20.

Koblin et al., "The IMPRIMATUR Multimedia IPR Management System", TELES AG (1997).

IMPRIMATUR: "Protection of Technological Measures", Institute for Information Law, Amsterdam, Nov. 1998, pp. 1-74.

* cited by examiner

BTC file format step S10.5

COPY PROTECTION OF DATA

BACKGROUND OF THE INVENTION

1. Field of the Invention

This invention relates to protecting data against copying and has particular application to protecting data transmitted through a network, such as hypermedia transmitted over a web-based network.

2. Related Art

It is known that data in the form of hypermedia such as hypertext, is often written in the hypertext language HTML and arranged in webpages that are provided by a server connected through a network to a client. The client may comprise a personal computer or other processing device capable of presenting the data retrieved from the server to a user. The network may comprise a local area network (LAN), a wide area network (WAN) or may comprise the Internet. For example, the World Wide Web comprises many servers connected over the Internet in a web, which have addresses in the form of universal resource locators (URL).

The hypertext information is arranged in webpages which include hotspots to allow the user to establish a link to another webpage, which may be located on the same or a different server, the routing to the document being achieved by use of a URL in the webpage at the hotspot.

Web clients typically access the hypermedia information using a browser. An overview of the World Wide Web and HTML is given in Chapter 1 of "HTML 3.2 and CGI Unleashed" J. December and M. Ginsberg 1996 (ISBN 1-57521-177-7).

As well known in the art, HTML webpages can display text, graphics and files of other descriptions such as video images, animated graphics and audio samples. Hypermedia have the significant advantage that the client can rapidly transfer viewing from one document to another by using a mouse to click on hotspots in the document, permitting the user to transfer from one web site to another, which may be at different physical locations.

The individual works which are displayed on the HTML pages may be copyright works. Because of the ease with which the copyright work may be viewed, transmitted and copied on the web, it is difficult for a copyright owner to enforce its copyright. For example, when a graphics file has been downloaded to a client, it may be readily copied onto the hard disc of a client's computer and replicated many times digitally, with no significant degradation from copy to copy.

SUMMARY OF THE INVENTION

With a view to overcoming this problem, the invention provides a method of copy protecting data sent from a server to a client for presentation to a user, comprising: cryptographically protecting the data; sending the cryptographically protected data to the client; and selectively controlling copying functions of the client in respect of the data whilst the data is being held by the client in a form suitable for presentation to the user.

The data may be cryptographically protected by encryption and/or by an integrity checking procedure such as hashing.

More specifically, the method according to the invention may include downloading a program object to the client, running the program object on the client such that a request is uploaded to the server for a file containing the cryptographically protected data, downloading the file to the client, and rendering the cryptographically protected data in an unprotected form suitable for presentation to the user, the program object being operative such that no, or restricted, copy or save functions are offered to the user in respect of the downloaded data in its unprotected form.

The invention has particular but not exclusive application to downloading data over a network such as the World Wide Web, but is also applicable to LANs, WANs and to distribution of data using long term storage media such as 3.5" floppy discs or CD-ROM based technology.

The method of the invention may be used with a conventional browser.

A message concerning a webpage may be downloaded from the server to the client, the message including information concerning the program object, such that a request is then uploaded to the server in response to the message, in order to retrieve the program object. The webpage may be written in HTML code. The program object may comprise a Java applet although the invention envisages the use of other program objects such as Active X or OLE.

As a result of processing a Java applet, the usual copy and save functions will not be presented to the user, thereby providing security in respect of the unprotected data presented to the user.

The data presented may comprise text, graphics, pictures, audio or any other suitable form.

The program object may include data concerning a cryptographic key, which can then be used to render the downloaded cryptographically protected data into an unprotected form suitable for presentation to the user.

An authentication procedure may be employed to ensure that the cryptographically protected data is only downloaded to an authenticated client. The authentication process may be performed by reference to a payment scheme, to enable a royalty to be collected in respect of the downloaded, cryptographically protected data.

It will be understood that no copy protection scheme can ever be completely successful, because when data is presented to users, they will have the opportunity to copy it. However in accordance with the invention the effort required to break the protection scheme provided by the inventive method may be significantly greater than the payment of a monetary sum to permit use of the protected data, thereby reducing the risk to the owner of the data releasing it through the World Wide Web or other open access networks.

The downloaded data may be steganographically marked, for example with a digital watermark. When the identity of the client is known, the watermark may include the client identity, in order to provide additional security in the event that fraudulent copies are made by the user.

The invention also includes a server configured to perform the inventive method.

The invention furthermore includes a method of downloading encrypted data from a server to a client, including: registering the client with the server by determining a machine identifier of the client by analysing its hardware and/or its software configuration, transmitting the machine identifier to the server, combining the transmitted machine identifier with a cryptographic key to form a unique determinator for the client, and transmitting the unique determinator to the client, to be stored therein for use subsequently in identifying the client to the server, to permit encrypted data to be downloaded thereto from the server; subsequently identifying the client to the server on the basis of the unique determinator; and then downloading data encrypted by means of the cryptographic key to the identified client, for decryption by the client using the key from the unique determinator.

The downloaded data can be decrypted at the client using the key from the unique determinator.

The client may be identified to the server by again determining the machine identifier for the client, comparing it with the machine identifier included in said unique determinator, and signalling to the server on the basis of the outcome of the comparison.

The client may be authenicated by the server prior to downloading the encrypted data. This may be carried out by generating a challenge, generating a response as a predetermined cryptographic function of the cryptographic key for the client as held by the server, and as a function of the key included in the unique determinator stored in the client, and authenticating the client on the basis of the outcome of the comparison.

BRIEF DESCRIPTION OF THE DRAWINGS

In order that the invention may be more fully understood an example will now be described with reference to the accompanying drawings, in which.

DETAILED DESCRIPTION

Figure 1:
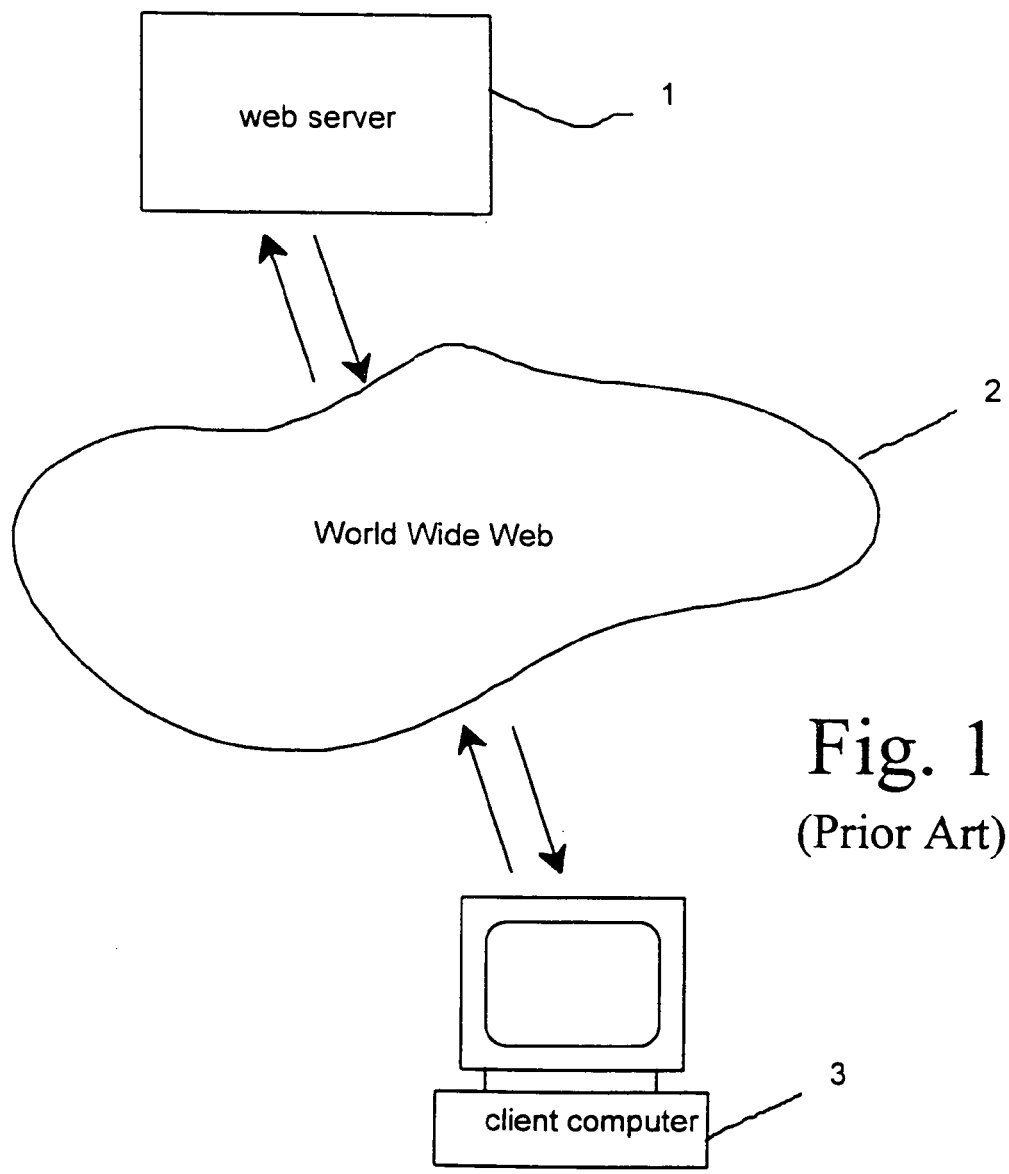
FIG. 1 is a schematic illustration of a conventional client and server connected through the World Wide Web.

An example of the invention will now be described in relation to the World Wide Web (WWW). As is well known, a page of information on a web server is identified on the web by means of an individual URL so that it can be accessed by a browser running on a client computer. Referring to FIG. 1, a web server 1 is connected through the World Wide Web 2, to a client computer in the form of a PC 3. HTML webpages can be downloaded to the client computer 3 from the web server 1, to be displayed to the user of the client computer 3. The HTML document may include links to other HTML pages on the same or a different web server, in a manner well known per se. The HTML webpages may also include embedded objects such as graphics, images and the like.

The client 3 runs a browser which receives the HTML documents from the web server 1 and displays them on the display of the computer. In this example, the browser is Java aware i.e. can interpret Java bytecodes received from the server. More particularly, as known in the art, when the HTML document includes a so-called Java applet tag, the server downloads a corresponding applet, consisting of Java bytecodes, which are interpreted and run by the browser. Typically, the downloaded Java applet allows interactivity between the user of the computer 3 and the displayed image. For further information, reference is directed to "HTML 3.2 and CGI Unleashed", supra, Chapter 18.

Figure 2:
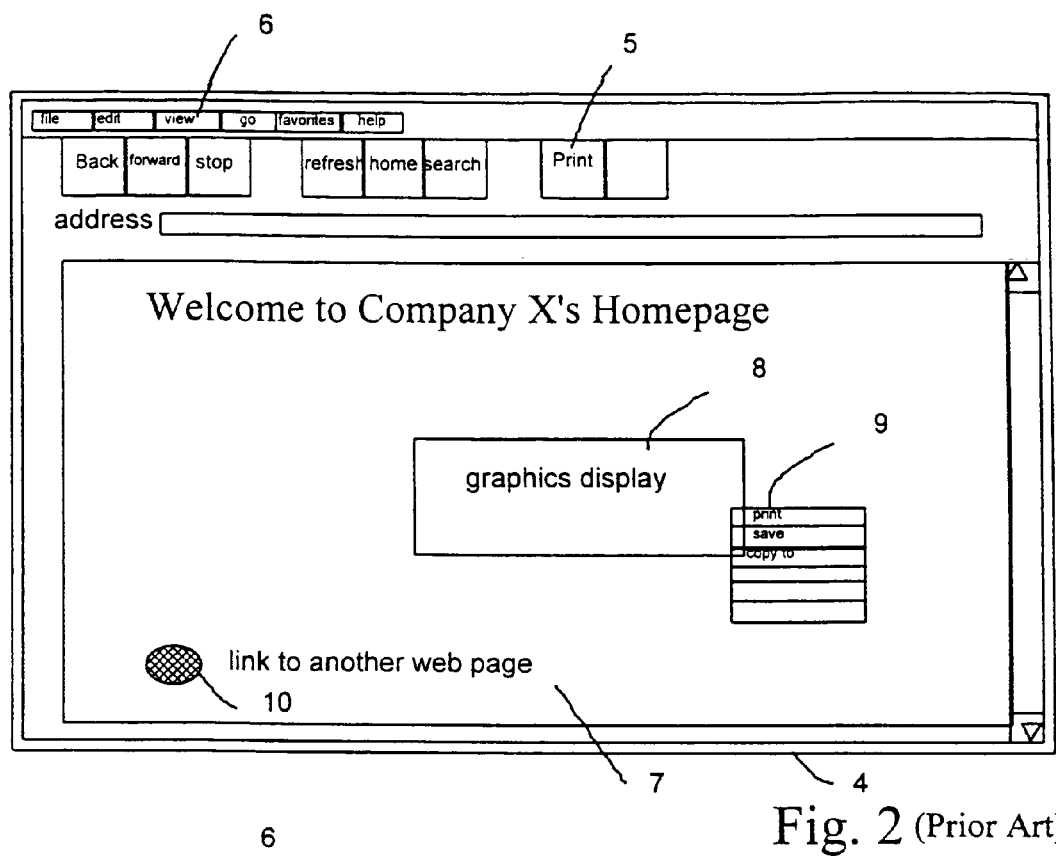
FIG. 2 is a schematic illustration of a conventional display provided by a web browser on the client 3.

An example of the screen display of an HTML webpage is shown in FIG. 2. The display is provided within a window 4 presented by the browser. Examples of a suitable browser are the Microsoft Internet Explorer 3.1 and the Netscape Navigator. The browser includes a number of conventional controls which are operated by clicking on a mouse, in the usual way. For example, the browser includes a print button 5 which allows a screen print to be produced of the entire page shown within the browser window 4. Also, the browser includes a control, shown schematically at 6, with a drop-down menu option "view source", which allows a display to be provided of the actual HTML code which is being run.

A page 7 is shown within the window 4 of the browser. The page is defined by a sequence of lines of HTML code which specify the text and layout provided on the page. Also, the code specifies areas which receive graphical, image data or other data that is downloaded in separate files which have a predetermined tag. In this example a graphics file with a tag "gif" is displayed. The HTML code causes the gif file to be displayed within the pre-defined area of the page. Thus, in the page 7, the gif file is displayed in region 8 defined by the downloaded HTML code. An example of the code for the gif file is shown in Code Extract No. 1, below.

| Code Extract No. 1 | |
| --- | --- |
| CE1.1 | <HTML> |
| CE1.2 | |
| CE1.3 | <HEAD><TITLE>Company X's Homepage</TITLE></HEAD> |
| CE1.4 | |
| CE1.5 | <BODY> |
| CE1.6 | Welcome to Company X's Homepage |
| CE1.7 | |
| CE1.8 | <IMG ALIGN=middle SRC="a_graphic.gif"><P> |
| CE1.9 | |
| CE1.10 | <A HREF="another.html">link to another web page</A> |
| CE1.11 | </BODY> |
| CE1.12 | |
| CE1.13 | </HTML> |

If the user clicks the computer's mouse in the area of the displayed image 8, using the right mouse button, a drop-down menu 9 is displayed which gives the user options including "save", to save the digital data corresponding to the gif file to the computer's hard disc or to some other storage location, and also the option to print, using a printer connected to the computer 3 (not shown). Thus, the user of computer 3 can make a copy of the digital data which comprises the graphics displayed in region 8 and the data can then be forwarded to other locations in an unrestricted manner. Because the data is recorded in digital form, it can be replicated many times without degradation of image quality.

Also, the entire page 7, including the graphics display 8, can be printed using the browser print button 5. However, the printed image quality can only at best be of that displayed on the screen of the computer. The printed image will be in the analogue domain so any processes that return the image to the digital domain will only further reduce the quality.

The displayed HTML page 7 also includes a hotspot 10. When the computer's mouse is clicked on the hotspot, a link is established to another webpage, which is then displayed within the window 4. The HTML code associated with the hotspot 10 includes a URL in order to establish the link to another webpage, in a manner well known per se.

As is well known in the art, HTML code can also include a Java applet. This consists of a programming object which is downloaded from the server 1, that can be run locally, within the browser 4. An applet is specified in HTML by a code tag—applet as will be described hereinafter. When the HTML interpreter in the browser encounters such a tag in a webpage, it refers back to the web server, which then downloads Java bytecodes to the browser. Typically, applets are used to display animated graphic symbols in a webpage, although many other applications can be provided, as well known to those skilled in the art. The location and size of the applet display is determined by instructions in lines of the HTML code.

If the user clicks the right mouse button on the data displayed by running the applet, no drop-down menu is provided corresponding to the menu 9 shown in FIG. 2. The user can use the view-source button 6 to display the lines of code which make up the HTML page being displayed, but this does not reveal the data that is displayed when the applet is run by the browser. The Java interpreter can display gif files when running an applet, within the applet, although normally, gif files are downloaded directly into the webpage because it is not normally necessary to process them in terms of Java bytecodes.

The present invention provides a method by which data can be downloaded to the webpage in a secure manner, and cannot be saved or copied whilst being displayed without significant fraudulent effort.

Figure 4:
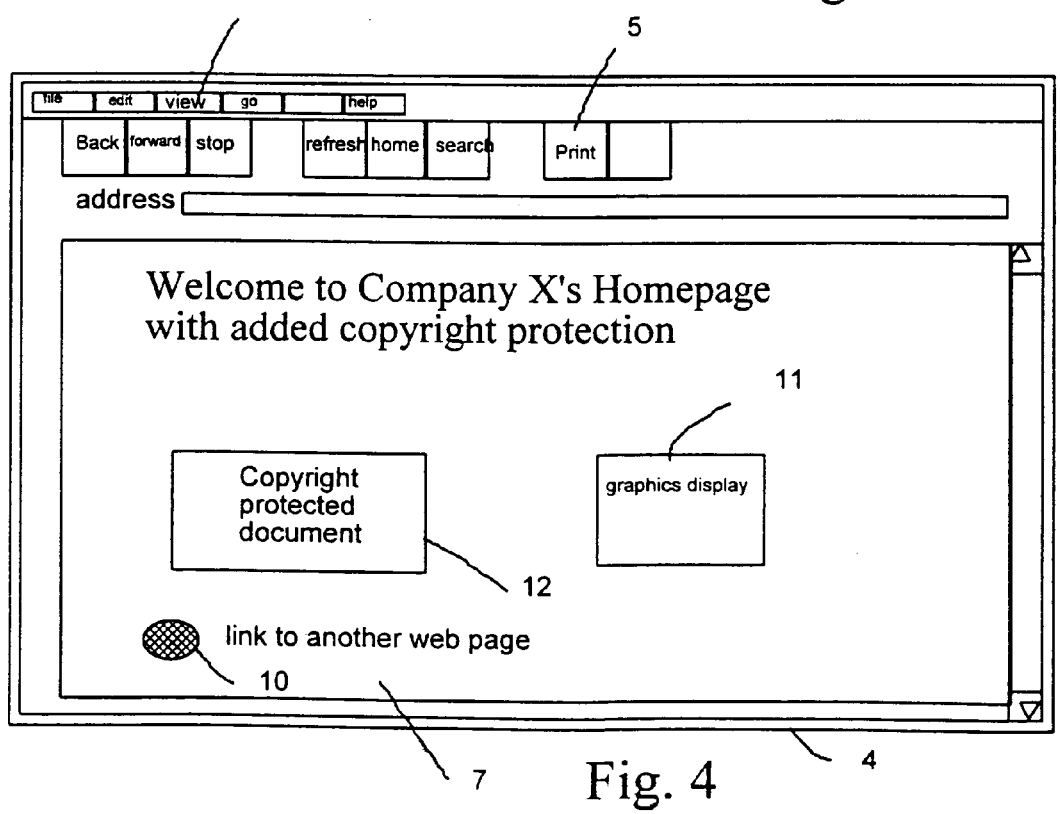
FIG. 4 is a schematic illustration of the display of a web browser in accordance with the invention.
Figure 3:
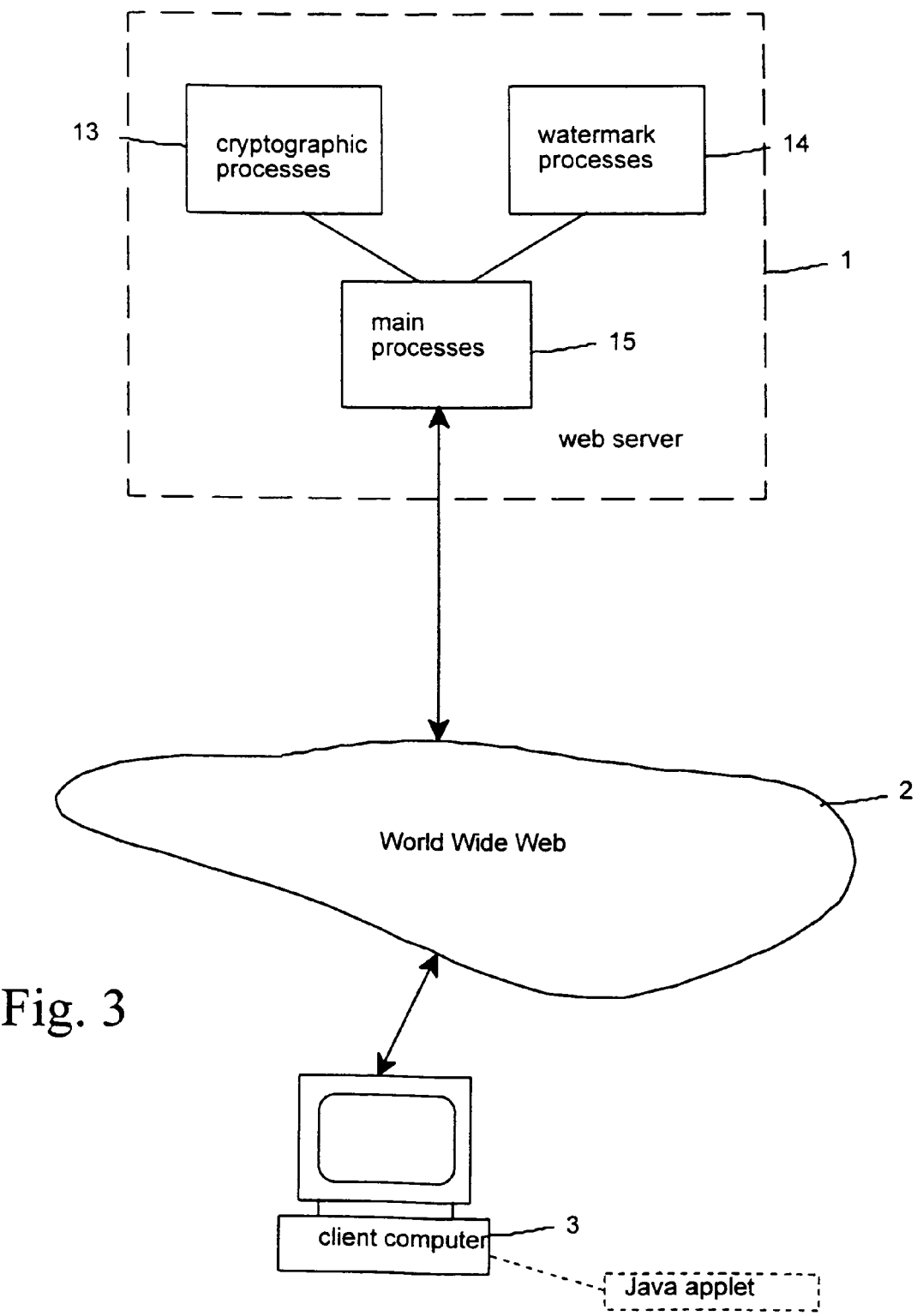
FIG. 3 is a schematic illustration of a web server 1 connected to a client 3 through the World Wide Web 2, in accordance with the invention.

An example of a downloading process in accordance with the invention will now be described in more detail with reference to FIGS. 3, 4 and 5. In this example, a webpage containing copyright protected image data is downloaded from the server 1 to client computer 3 through the World Wide Web 2. The resulting display in the browser 4 is shown in FIG. 4 and the processing steps are shown in more detail in FIG. 5.

At step S1 the client 3 uploads a request to the server 1 for details of a webpage. The request comprises a conventional hypertext file transfer protocol (HTTP) page request. The server then, at step S2, gets the page, or constructs it "on the fly" and downloads the HTML code corresponding to the page, to the client 3 through the World Wide Web (WWW) 2. In the usual way, the HTML code includes references for images, graphics, sound bytes and the like and in response to such codes, the server will upload HTTP requests for corresponding files to be displayed in the webpage. For example, referring to the webpage 7 shown in FIG. 4, it includes a graphical image 11 constituted by a gif file. In order to obtain the data for the display 11, an HTTP request is uploaded at step S3 to the server, and corresponding binary graphical data is downloaded at step S4. This data is then displayed in region 11 of the page 7 shown in FIG. 4. However, this data is not copyright protected because the user can save and copy it using the right mouse button as previously explained with reference to FIG. 2.

However, in accordance with the invention, region 12 of the displayed page 7 is copyright protected. The HTML code associated with the page 7 of FIG. 4 is shown in Code Extract No. 2, below, and references an applet A1 at line CE2.8.

| Code Extract No. 2 | |
|---|---|
| CE2.1 | <HTML> |
| CE2.2 | |
| CE2.3 | <HEAD><TITLE>Company X's Homepage</TITLE></HEAD> |
| CE2.4 | |
| CE2.5 | <BODY> |
| CE2.6 | Welcome to Company X's Homepage with added copyright protection |
| CE2.7 | |
| CE2.8 | <APPLET CODE=BTCBrowserApplet.class WIDTH=200 HEIGHT=150> |
| CE2.9 | <PARAM NAME = file VALUE="a_graphic.gif"> |
| CE2.10 | </APPLET> |
| CE2.11 | <IMG SRC="another_graphic.gif"><P> |
| CE2.12 | |
| CE2.13 | <A HREF="another.html">link to another web page</A> |
| CE2.14 | </BODY> |
| CE2.15 | |
| CE2.16 | </HTML> |

Figure 5:
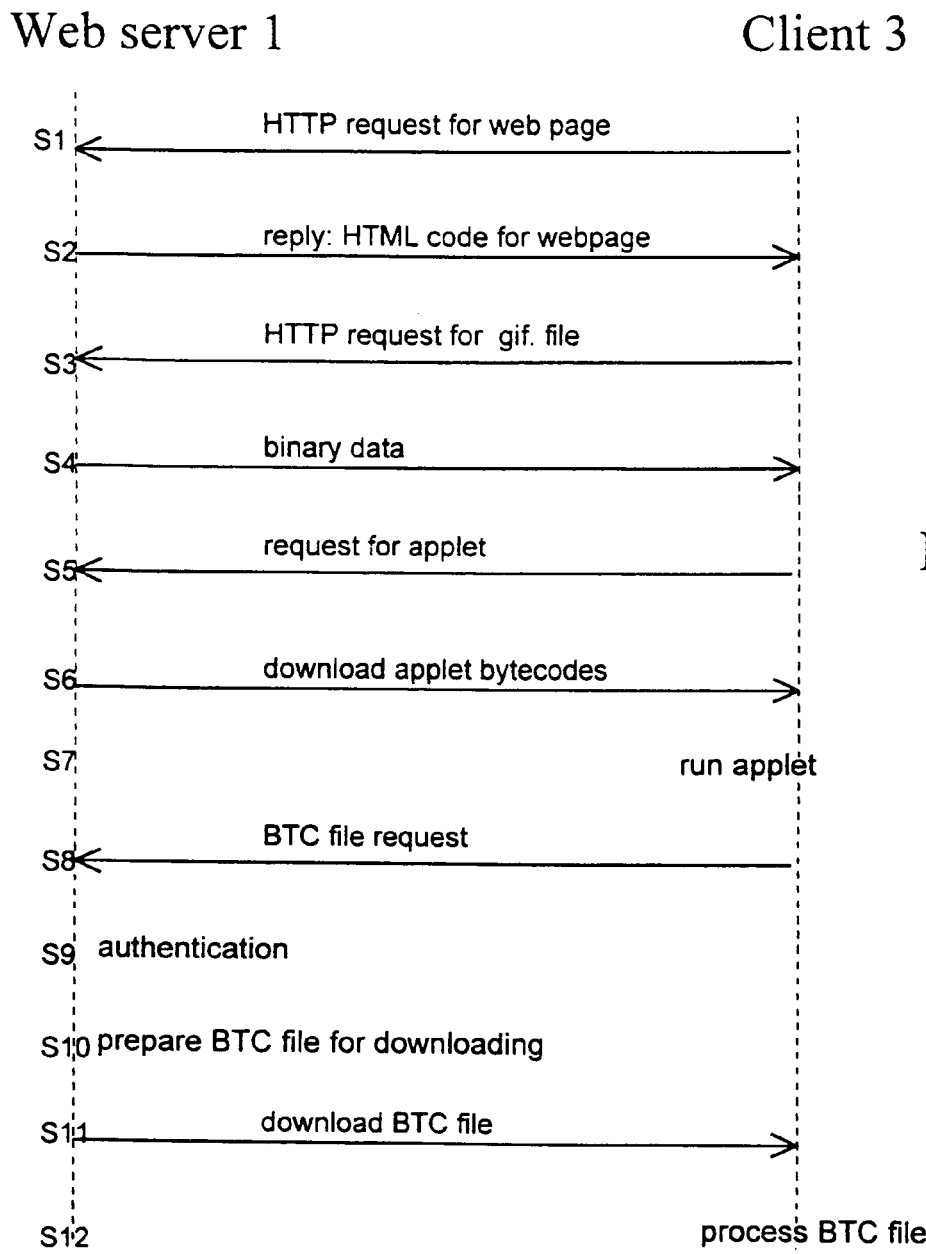
FIG. 5 is a schematic illustration of data flows between the client and server in accordance with an example of the invention.

The Java bytecodes for running the applet are downloaded to the client from the server 1 to the client 3 at step S6 in FIG. 5. The applet A1 is then run on the client, using the Java interpreter within the browser, in order to prepare the browser to receive data to be displayed in region 12 of the webpage, downloaded from the server.

The data to be displayed in region 12 is cryptographically protected so that it cannot be readily deciphered, by monitoring the downloaded signals. In this example, the cryptographic protection includes encryption of the downloaded data together with hashing, as will be explained in more detail hereinafter.

The applet A1 allows the downloaded file to be decrypted and checked for integrity i.e. hash verified. More specifically, the applet A1 includes the following: a hashing algorithm HA, a master hashing key $K_{MH}$, an encryption algorithm EA, an encryption key $K_E$ and a BTC file request. As used herein, the term BTC refers to a file of copyright protected data, for display at the browser.

The applet A1 is run at step S7 on the client computer 3 and at step S8, the applet causes a BTC file request to be uploaded to the server 1.

At step S9, the server performs an authentication step in order to determine whether it is safe to download the requested BTC file to the client. The authentication may be carried out in a number of different ways. For example, the server may only download the file if the client has made a payment, so as to allow the owner of the copyright of the BTC file to collect a royalty for the act of viewing the file. A micropayment scheme for this purpose is described in our co-pending patent application No. GB 9624127.8 entitled Transaction System. Alternatively, the client 3 may be known to the server in respect of some other service being provided, for example an Internet home shopping scheme, and the client's credentials may be authenticated by means of procedures already in use for the service.

Assuming that the client 3 passes the authentication step S9, the server then, at step S10, prepares the BTC file for downloading to the client 3.

Figure 6:
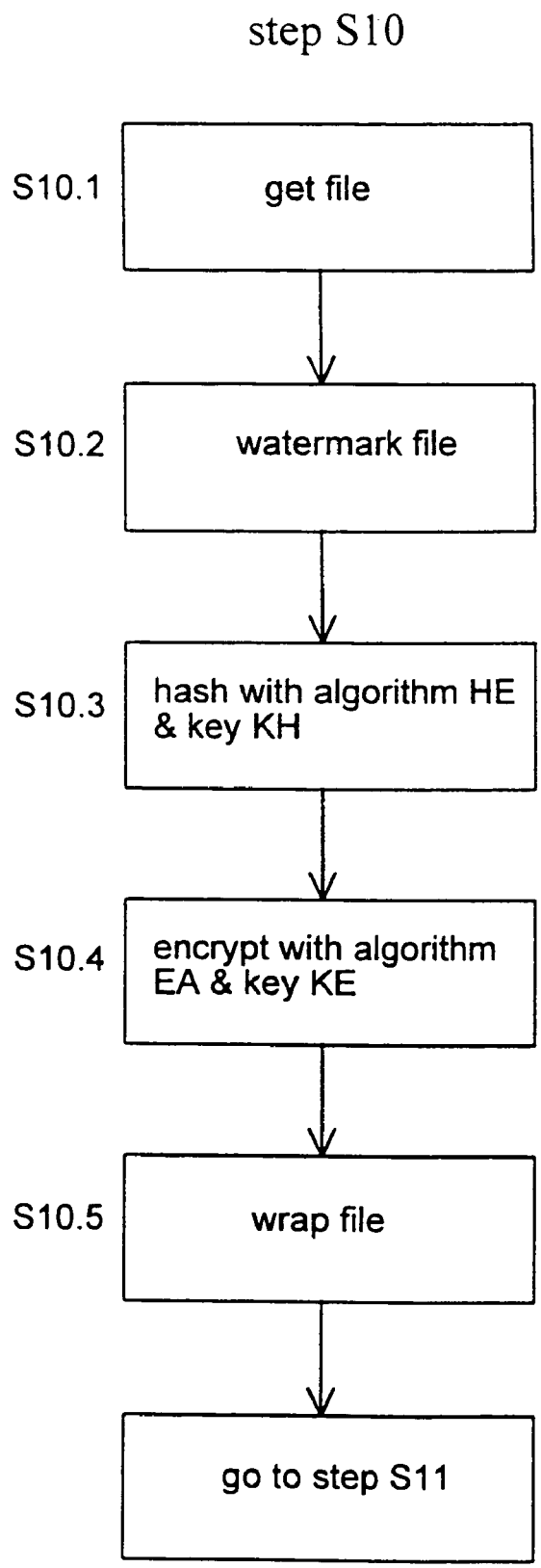
FIG. 6 is a schematic flow diagram associated with step S10 of FIG. 5.

The step S10 is shown in more detail in FIG. 6. At step S10.1 the relevant data is fetched. This may comprise graphics data, audio, video, text or an other appropriate data format.

At step S10.2, the data is watermarked. This may involve changing some of the bits in the data stream so as to record a pattern which is imperceptible in the image displayed by the browser 4, when the data is downloaded to the client. Watermarking is a well known example of a technique termed steganography. For a general review of this technique and digital watermarks, reference is directed to "Disappearing Cryptography", P. Wayner, Academic Press 1996 (ISBN 0-12-738671-8). Watermarking gives additional security in the event the protected data is copied, because knowledge of the source of copying can be determined from the watermark. Thus, if the authentication step (step S9) provides the server with a particular identity for the client, the identity may be watermarked at step S10.2 into the data.

At step S10.3, the watermarked data is hashed at the server, using a copy of the hashing algorithm HA that was downloaded in applet A1 and a file-specific session hashing key $K_{SH}$. The hashing process consists of using the algorithm HA and the key $K_{SH}$ together with the data bits of the encrypted data, to form additional bits HV, in the manner of parity bits, that are added to the data string. The hashing ensures that sections of data are not removed and replaced by others, in order to ensure that for example a command "pay U$1" is not changed to "pay US$100". A suitable form of hashing algorithm is SHA which is described in more detail in National Institute of Standards and Technology, Federal Information Processing Standards Publication 180-1 (NIST FIPS PUB 180-1) SECURE HASH STANDARD.

As step S10.4 the data is encrypted at the server 1, using a copy of the algorithm EA and the key $K_E$ which were downloaded previously to the client, in the Java bytecodes of applet A1. An example of an encryption algorithm is the DES algorithm and reference is directed to the National Institute of Standards and Technology, Federal Information Processing Standards Publication 46-2 (NIST FIPS PUB 46-2) DATA ENCRYPTION STANDARD (DES). The encryption algorithm AE is actually a pair of algorithms, one of which is used to encrypt and the other to decrypt. It will be understood that the key $K_E$ is changed periodically as is known to be good practice in the art.

Then the resulting file, at step S10.5 is wrapped in a proprietary BTC file format which itself includes additional cryptographic protection techniques.

Figure 7:
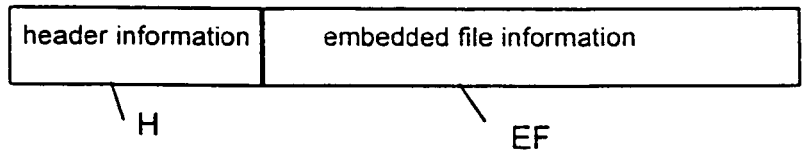
FIG. 7 is a schematic illustration of the BT copyright (BTC) file structure.
Figure 8:
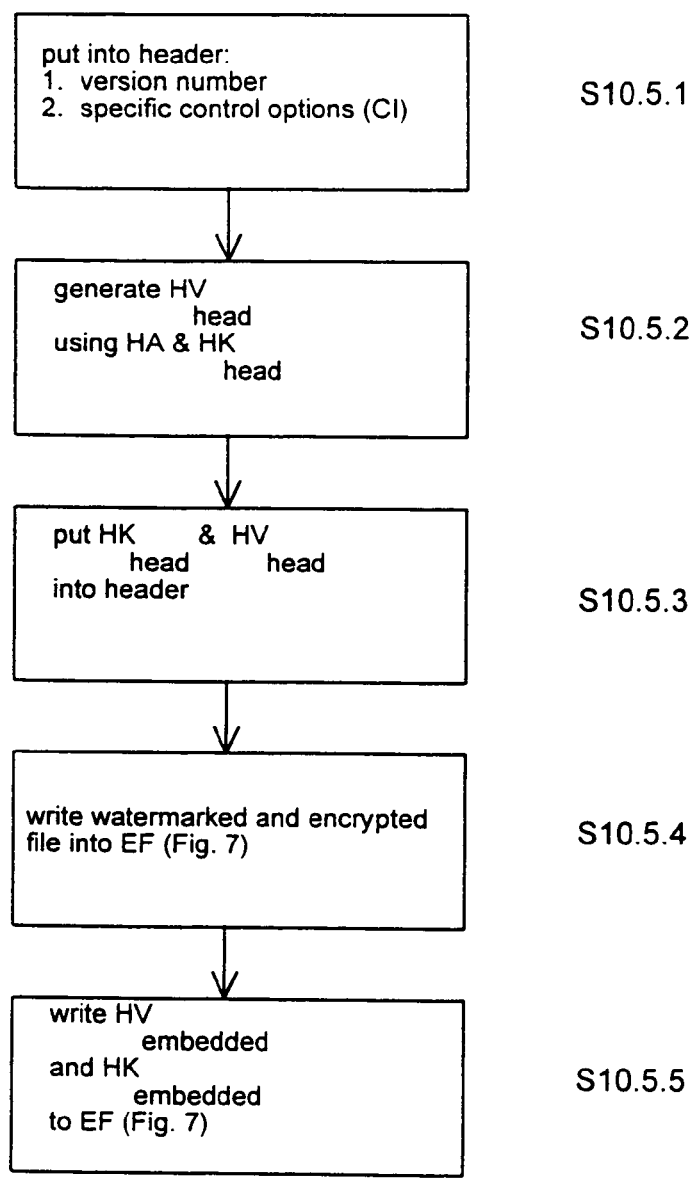
FIG. 8 is a flow chart showing in detail the actions carried out during the wrapping step 10.5 of FIG. 6.

The proprietary BTC file format is shown in FIG. 7. The BTC file format comprises header information H, and an embedded file EF. The processing performed at step S10.5 is shown in more detail in FIG. 8.

The BTC file in step S10.5 is generated as follows. In step S10.5.1 partial information for the header H is generated. This comprises a version number for the file format, and any specific copyright protection control information CI for the file.

In step S10.5.2 the integrity of all of this information is protected by generating a hash value $HV_{head}$ using a hashing key $HK_{head}$.

In step S10.5.3 the hashing key used on the header $HK_{head}$, and the generated hash value $HV_{head}$ are both appended to the header H, so as to complete it.

In step S10.5.4 the watermarked, and encrypted file generated in step S10.4 is appended to the header H to form part of the embedded file EF in FIG. 7.

In step S10.5.5 information which describes the hashing that was performed in step S10.3 is appended to the file EF. This information comprises the specific session hashing key $K_{SH}$ used on the embedded file hereinafter referred to as $HK_{embedded}$ and the hash value HV generated in step S10.3 hereinafter referred to as $HV_{embedded}$. This completes the BTC file.

At step S11 (FIG. 5) the BTC file is downloaded to the client 3.

Figure 9:
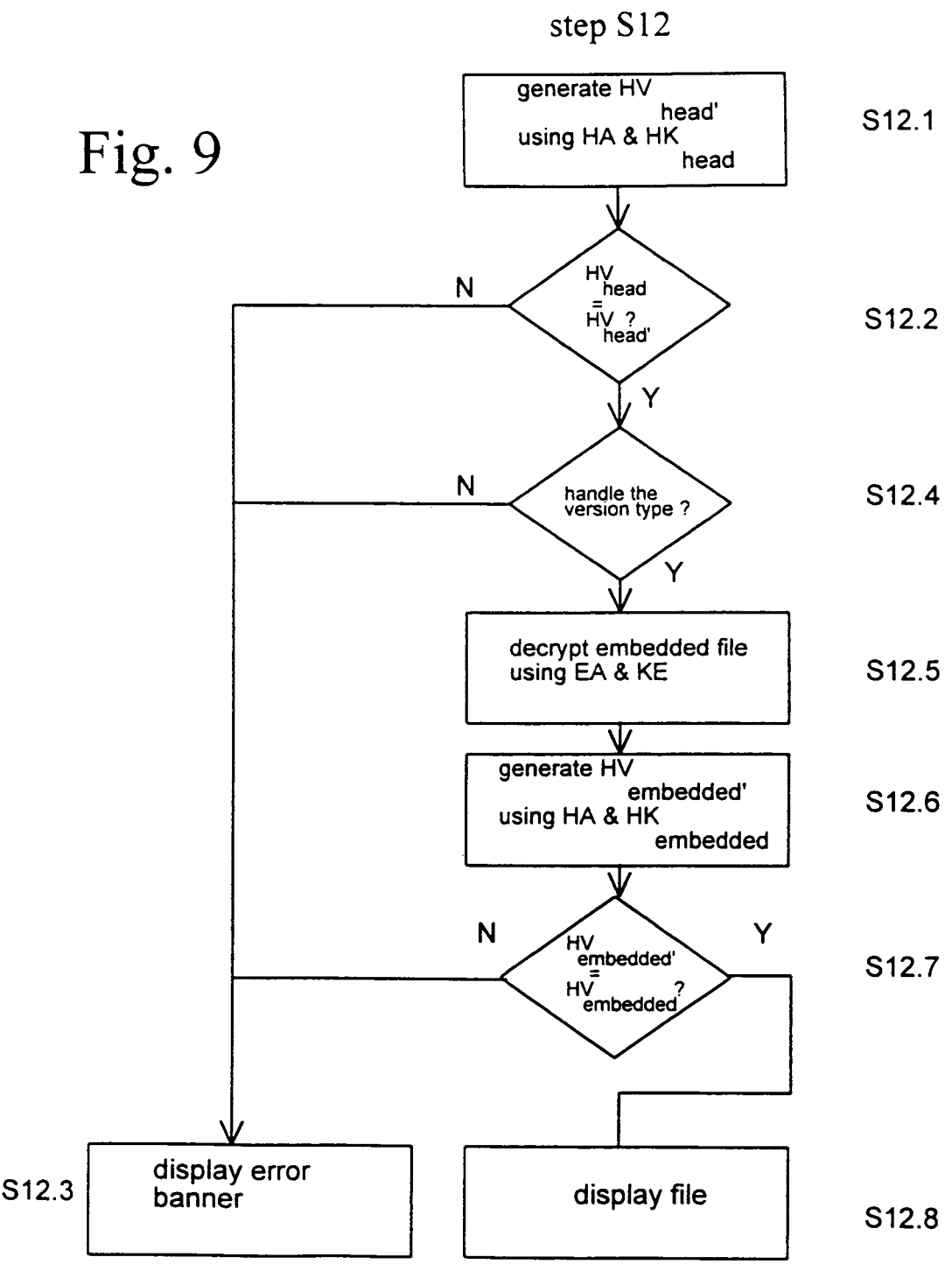
FIG. 9 is a schematic flow diagram associated with step S12 of FIG. 5.

Then, at step S12, the BTC file is processed using the applet A1 previously downloaded to the client 3. The processing performed at step S12 is shown in more detail in FIG. 9. At steps S12.1 and S12.2 the integrity of the content of the header H is verified. In step S12.1, using the hashing algorithm HA, and the hashing key used on the header $HK_{head}$ (recovered from the header H of the BTC file) the hash value $HV_{head}$ of the header is generated. At step S12.2 the value is checked against the hash value $HV_{head}$ recovered from the BTC file header H.

If the result of the check is unsatisfactory, an error banner is displayed at step S12.3 in the region 12 (FIG. 4) in the window of the browser 4. However, if the integrity check is satisfactory, the applet A1 checks in step S12.4 that it knows how to process files of the type specified in the version number recovered from the header 1 of FIG. 7. If the result of the check is unsatisfactory, an error banner is displayed at step S12.3 in the region 12 (FIG. 4) in the window of the browser 4. However if the check is satisfactory, the applet A1 can make use of the specific copyright protection control information CI for the file (present in the header H of FIG. 7) when processing user requests for data manipulation.

In step S12.5 the embedded file EF is decrypted using the encryption algorithm EA and the key $K_E$ previously downloaded in the applet A1.

In steps S12.6 and S12.7 the integrity of the content of the decrypted file is verified as follows. In step S12.6, using the hashing algorithm HA, and the hashing key used on the embedded file (recovered from the embedded file EF in the BTC file) the hash value $HV_{embedded'}$ is generated. In step S12.7 the value is checked against the hash value $HV_{embedded}$ recovered from the BTC embedded file EF.

If the result of the check is unsatisfactory, an error banner is displayed at step S12.3 in the region 12 (FIG. 4) in the window of the browser 4. However, if the integrity check is satisfactory, the applet A1 can display the content of the decrypted file in the region 12 FIG. 4) in the window of the browser 4 in step S12.8.

Thus, if the BTC file contains image data, the image is displayed, together with its imperceptible watermark, in the region 12 of webpage 7 shown in FIG. 4. The user cannot save or copy the image data. Because the Java enabled browser is running an applet for the image data in region 12, the functions of the right mouse button are disabled for region 12. Therefore, if the user clicks the mouse with the right button, no menu option is automatically provided for saving, copying or printing the displayed data in region 12. The right mouse button function is disabled according to usual Java operation for applets as previously described. The user could operate the print button 5 of the browser 4 but this would only print a low quality image and would not permit the digital data that comprises the image 12 to be recovered for the purpose of providing a high quality copy.

Furthermore, if the downloaded BTC file is cached in the browser, it will be cached in its cryptographically protected form so that making copies of the cached file does not permit access to the downloaded data in the BTC file, unless substantial code breaking activities are fraudulently undertaken by the user.

It will be understood that no copyright protection scheme can ever be completely successful because when a copyright work is presented to a user, they will have an opportunity to copy it. The purpose of the present scheme however, is to make payment of a small monetary sum in respect of the copyright protected work, more attractive than the effort of breaking the protection regime provided by the invention. An analogy can be drawn with copying pages of a book with a photocopier. In theory, it would be possible to borrow a book and then photocopy all of its pages. However, in practice, this is very inconvenient and it is probably easier to purchase another copy of the book. Similarly, in the described example of the invention, it is simpler to pay for viewing of the copyright work than spending time breaking the copyright protection scheme.

Many modifications and variations fall within the scope of the invention. For example, the running of the applet A1 may be modified according to the downloaded copyright control information CI in order to provide a restricted set of functions when operating the right mouse button on the display area 12. For example, operation of the right mouse button on the display area 12 may optionally provide a drop down menu which offers the user a copyright notice giving details of the copyright owner of the displayed image.

Also, the menu may offer an option to save the document in an unprotected format upon payment of an additional larger fee than that paid to view the image initially.

Considering the applet A1 downloaded at step S6 in FIG. 5, it may not be necessary to include the encryption and hashing algorithms EA and HA for every downloading operation. It is preferable, but not essential that the algorithms are kept secret, so that they could be pre-loaded onto the client computer, and held in a data file on its hard disc.

If the server 1 knows the identity of the client 3, at the time of requesting the applet A1, individual encryption and hashing keys can be downloaded in the Java bytecodes A1, at step S6. The embedded EF file in FIG. 7 can then be encrypted and hashed using the individual keys, specific to the client 3, when the file is prepared at step S10 for downloading. The use of individual keys, specific to the client 3, improves security.

Figure 10:
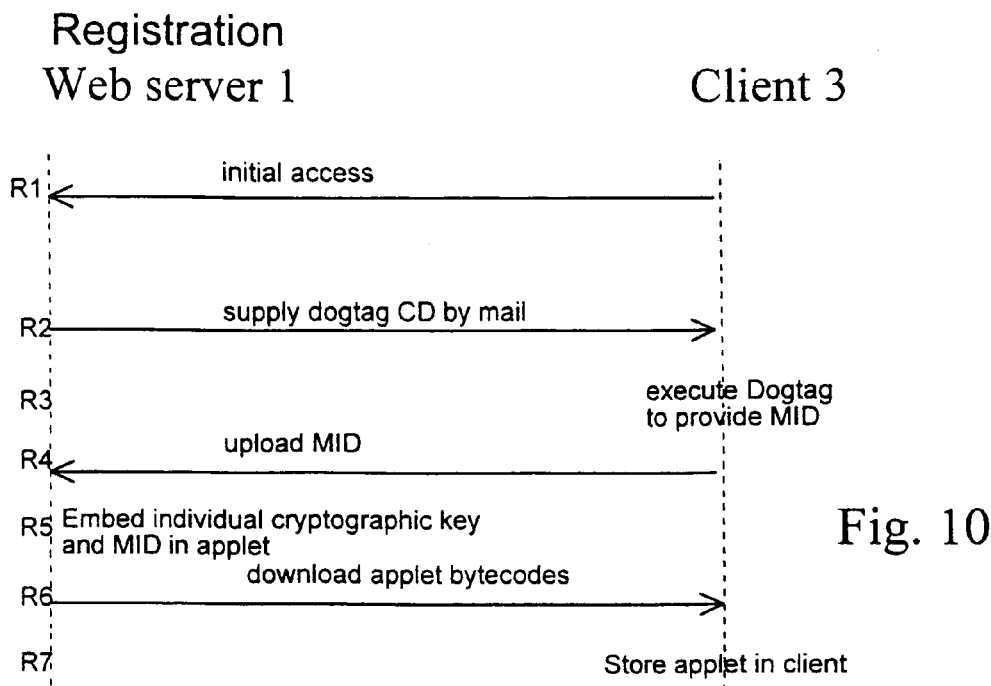
FIG. 10 is a schematic illustration of data flows associated with a procedure for registering a client with the server.

An example of how an individual key can be provided, will now be described with reference to FIGS. 10 and 11. FIG. 10 illustrates an initial registration procedure by which details of the client 3 are made known to the web server 1. At step R1, the client 3 contacts the web server 1 with a request to become registered for the copyright protection scheme. The web server 1, at step R2 provides the client with a program referred to herein as a dogtag. The dogtag is typically provided on a compact optical disc (CD), possibly in combination with other software, e.g. for shopping over the Internet or a micropayment scheme. By sending the CD through the postal service to a specified address, there is reasonable certainty that the client machine which runs the dogtag corresponds to the user who requested it. The CD may also include the encryption and hashing algorithms EA and HA which can be pre-loaded onto the client's hard disc.

At step R3, the dogtag program is run in order to provide a machine identification code (MID) which provides a substantially unique identification of the client. The dogtag program scans the client computer both in terms of its hardware and software. Examples of characteristics of the client which can be used to form the MID are as follows:

The physical components of which the computer comprises (size of memory, presence of CD drive)
Characteristics of the physical components (manufacturer, number of tracks on a hard disc)
Location of static information on a hard disc (bad sectors)
Location of long lived files on a hard disk (operating system executables)
Operation characteristics
Logical directory and file structures
Files specifically created to identify the machine
Data added to long lived files to identify the machine
The configuration of applications and the operating system
Identification number of hardware, e.g. hard disc.

For added security, the dogtag can only be run once for registration purposes.

At step R4, the MID is uploaded through the WWW 2 to the web server 1. At step R5 an individual cryptographic key $K_I$ is embedded together with the MID in the bytecodes of the Java applet which is then downloaded at step R6 to the client 3 and is stored on the hard disc thereof at step R7. The individual key $K_I$ actually comprises a set of keys, individually provided for each client 3 for use in hashing and encrypting as previously described.

Figure 11:
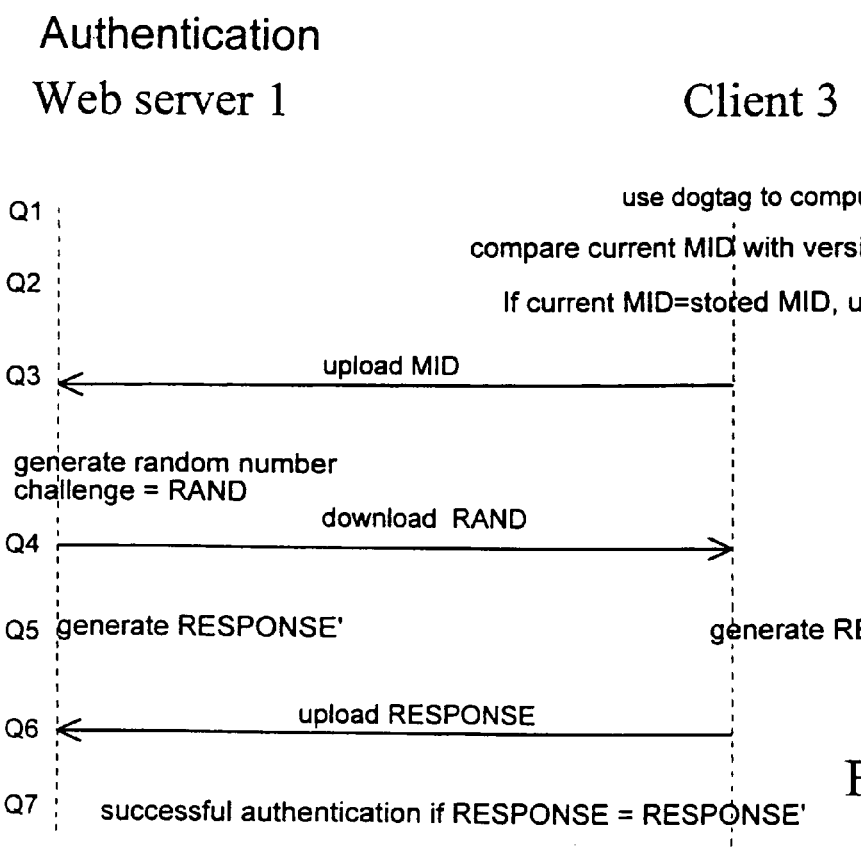
FIG. 11 is a schematic illustration of authentication, subsequent to registration according to FIG. 10, corresponding to step S9 of FIG. 5.

Referring now to FIG. 11, this shows how the authentication step, step S9 in FIG. 5, can be performed, subsequent to the registration procedure of FIG. 10.

At step Q1, the dogtag program is used to produce a current MID. This is compared, at step Q2, with the MID stored on the hard disc of the client at step R7, during the registration procedure. If the MIDs are the same, the current value of MID is sent at step Q3 to the web server 1.

At step Q4, the web server 1 generates a challenge consisting of a random number, RAND, which is transmitted to the client 3. Then, at step Q5, the client computes RESPONSE as a cryptographic function of the MID, the challenge RAND and the stored individual cryptographic key $K_I$.

At step Q6, the RESPONSE is sent to the web server 1 through WWW 2. Meanwhile at step Q5, the web server also generates a response, namely RESPONSE' in the same was as performed by the client 3. At step Q7 the RESPONSE is compared with RESPONSE' and if they correspond, the client has been successfully authenticated. In this situation, the BTC file can be downloaded, as shown at steps S10 and S11 in FIG. 5, using individual keys, specific to the client, for encryption and hashing. The keys used may be session keys, generated from key batches and a batch number.

Other forms of authentication can be used. For example, a smart card can be used in the manner of a SIM card used with GSM mobile telephones, in combination with a SIM card reader connected to the client 3. This has the advantage that the identity of the user is monitored rather than the identity of the client computer, so that the user can move from machine to machine and still use the service.

Referring again to FIG. 3, the web server 1 is illustrated as having different functional blocks 13, 14 and 15. Block 13 performs the cryptographic processes associated with steps S10.3 and S10.4 of FIG. 6, block 14 performs the watermarking processes described with reference to step S10.2 and block 15 performs the other processes. In some situations, it may be convenient to provide separate cryptographic servers and watermark servers so that the provision of keys and watermarking can be performed as a separate service to a number of different web servers.

Whilst the described example of the invention uses the Java programming language, it will be understood that other hypermedia languages may be used, for example Active X and OLE.

The registration and authentication procedure described with reference to FIGS. 10 and 11 may also be used for other authentication processes in which a client is required to register with a web server. Thus, this procedure could be used for processes which involve other data transfer regimes between the client and server in which a registration and authentication is needed.

What is claimed is:

1. A method of protecting data sent from a server to a client, said method comprising:
   running a program portion at the client, the program portion generating and uploading to the server a request for access to data;
   cryptographically protecting the data;
   sending the cryptographically protected data to the client; and
   after the running of the program portion has begun and under control of the program portion at the client, converting the cryptographically protected data to an unprotected form and selectively controlling access to copy or save functions at the client in respect of the data in its unprotected form.

2. A method as in claim 1 wherein cryptographically protecting the data comprises protecting the data by encryption.

3. A method as in claim 1 wherein cryptographically protecting the data comprises protecting the integrity of the data cryptographically.

4. A method as in claim 3 wherein the integrity of the data is achieved by hashing.

5. A method as in claim 1 including authenticating that the client is permitted to receive the data.

6. A method as in claim 1 including identifying the client to the server before the data are sent to the client.

7. A method as in claim 1 including:
   generating the program portion at a server,
   downloading the program portion to the client, and
   running the program portion on the client such that a request is uploaded to the server for a file containing the cryptographically protected data.

8. A method as in claim 7 wherein the program portion is generated in response to, and corresponds with, an earlier received request for access to the data.

9. A method of controlling access to data downloaded from a server computer to a client computer, said method comprising:
   downloading a protected copy of requested data from a server to a client; and
   before using said protected copy, running a program at the client so that after running the program at the client has begun at the client, the program serves to both: (a) unprotect the downloaded data thereby to provide access to an unprotected copy of the requested data, and (b) suppress client computer copy or save functions with respect to the unprotected copy of the requested data.

10. A method of controlling access to data sent from a server to a client, said method comprising:
    running a program portion at the client, the program portion generating and uploading to the server a request for access to data;
    cryptographically protecting the data;
    sending the cryptographically protected data to the client; and
    after access to the program portion is permitted and under control of the program portion, converting the cryptographically protected data to an unprotected form and restricting or preventing access to copy or save functions at the client in respect of the data in its unprotected form.

11. A method of controlling access to data downloaded from a server computer to a client computer, said method comprising:
    downloading a protected copy of requested data from a server to a client; and
    running a program at the client after access to the program is permitted to both: (a) unprotect the downloaded data thereby to provide access to an unprotected copy of the requested data, and (b) restrict or prevent client computer copy or save functions with respect to the unprotected copy of the requested data.

12. A method as in claim 1 wherein the data are sent to the client from the server through a network.

13. A server for providing access to data sets in a protected form, the server comprising:
    an input for receiving a request for access to a data set;
    protecting means for cryptographically protecting the requested data set; and
    generating means for generating a program portion for sending to the source of the access request,
    wherein said program portion is operable and after the program portion is permitted to run at the source of the access request, in use:
      to generate a request for access to the cryptographically protected data set;
      on receipt of the cryptographically protected data set, to convert it into an unprotected form; and
      to selectively control access to copy or save functions in respect of the data set when in said unprotected form.

14. A method as in claim 7 wherein the program portion includes data concerning a cryptographic key, and the method including using the key to render the downloaded cryptographically protected data into an unprotected form.

15. A method as in claim 1 wherein the server and the client each hold data corresponding to a cryptographic key and a machine identifier for uniquely identifying the client, the method including:
    sending a challenge to the client, such that it generates a signed response as a cryptographic function of the key and the machine identifier held therein,
    generating from the cryptographic key and machine identifier held associated with the server, a corresponding signed response as a cryptographic function of the key and the machine identifier, comparing the signed responses from the client and the server, and if they correspond, performing the cryptographic protection of the data with the key, and converting the cryptographically protected data into an unprotected form at the client with the key.

16. A method as in claim 1 wherein the data is steganographically marked.

17. A method as in claim 1 including registering the client with the server.

18. A method as in claim 1 including:

determining a machine identifier of the client by analysing its hardware and/or its software configuration, transmitting the machine identifier to the server, combining the transmitted machine identifier with a cryptographic key to form a unique determinator for the client, transmitting the unique determinator to the client, to be stored therein for use subsequently in identifying the client to the server, to permit encypted data to be downloaded thereto from the server.

19. A method of protecting data downloaded from a server computer to a client computer, said method comprising:

downloading a protected copy of requested data from a server to a client; and running a program at the client after access to the program is permitted to both: (a) unprotect the downloaded data thereby to provide access to an unprotected copy of the requested data, and (b) restrict or prevent client computer copy and save functions with respect to the unprotected copy of the requested data.

20. A method as in claim 19, wherein the program running at the client generates and uploads a request for data from the client to the server, and the protected copy of requested data is downloaded from the server to the client in response to the request.

21. A data storage medium storing copy protected data on the client received by a method according to claim 1.

22. A computer program carrier medium containing a computer program which are executable by a computer to perform method steps for implementing a server, the method steps comprising:

receiving a request for access to a data set;

cryptographically protecting the requested data set; and generating a program portion for sending to the source of the access request, wherein said program portion is operable and after the program portion is permitted to run at the source of the access request, in use:

generating a request for access to the cryptographically protected data set;

on receipt of the cryptographically protected data set, converting it into an unprotected form; and selectively controlling access to copy or save functions in respect of the data set when in said unprotected form.

23. A method of protecting data downloaded from a server computer to a client computer, said method comprising:

downloading a protected copy of requested data from a server to a client; and running a program at the client so that after running the program at the client has begun at the client, the program serves to both: (a) unprotect the downloaded data thereby to provide access to an unprotected copy of the requested data, and (b) suppress client computer copy and save functions with respect to the unprotected copy of the requested data.

24. A method as in claim 23, wherein the program running at the client generates and uploads a request for data from the client to the server, and the protected copy of requested data is downloaded from the server to the client in response to the request.

25. A method of protecting data sent from a server to a client, said method comprising:

running a program portion at the client, the program portion generating and uploading to the server a request for access to data;

cryptographically protecting the data;

sending the cryptographically protected data to the client; and after access to the program portion is permitted and under control of the program portion, converting the cryptographically protected data to an unprotected form and restricting or preventing access to copy or save functions at the client in respect of the data in its unprotected form.

26. A server for providing access to data sets in a protected form, the server comprising:

an input for receiving a request for access to a data set;

protecting means for cryptographically protecting the requested data set; and generating means for generating a program portion for sending to the source of the access request, wherein after access to the program portion is permitted and said program portion is operable, in use:

to generate a request for access to the cryptographically protected data set;

on receipt of the cryptographically protected data set, to convert it into an unprotected form; and to restrict or prevent access to copy or save functions in respect of the data set when in said unprotected form.

* * * * *